US008022952B2

(12) United States Patent
Hao et al.

(10) Patent No.: US 8,022,952 B2
(45) Date of Patent: Sep. 20, 2011

(54) GENERATING A VISUALIZATION TO SHOW MINING RESULTS PRODUCED FROM SELECTED DATA ITEMS AND ATTRIBUTE(S) IN A SELECTED FOCUS AREA AND OTHER PORTIONS OF A DATA SET

(75) Inventors: Ming C. Hao, Palo Alto, CA (US);
Umeshwar Dayal, Saratoga, CA (US);
Daniel A. Keim, Stasslingen (DE);
Dominik Morent, Constance (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 996 days.

(21) Appl. No.: 11/888,118

(22) Filed: Jul. 31, 2007

(65) Prior Publication Data
US 2009/0033664 A1    Feb. 5, 2009

(51) Int. Cl.
G06T 11/20    (2006.01)
(52) U.S. Cl. ......................................................... 345/440
(58) Field of Classification Search .................. 345/440; 702/68
See application file for complete search history.

(56) References Cited

U.S. PATENT DOCUMENTS

| 3,487,308 A | 12/1969 | Johnson |
| 5,581,797 A | 12/1996 | Baker et al. |
| 5,588,117 A | 12/1996 | Karp et al. |
| 5,608,904 A | 3/1997 | Chaudhuri et al. |
| 5,623,590 A | 4/1997 | Becker et al. |
| 5,623,598 A | 4/1997 | Voigt et al. |
| 5,634,133 A | 5/1997 | Kelley |
| 5,659,768 A | 8/1997 | Forbes et al. |
| 5,694,591 A | 12/1997 | Du et al. |
| 5,742,778 A | 4/1998 | Hao et al. |
| 5,757,356 A | 5/1998 | Takeasaki et al. |
| 5,801,688 A | 9/1998 | Mead et al. |
| 5,828,866 A | 10/1998 | Hao et al. |

(Continued)

FOREIGN PATENT DOCUMENTS
EP    0778001    11/1996

OTHER PUBLICATIONS

Jessica Lin, Eamonn Keogh, Stefano Lonardi, Jeffrey P. Lankford, Donna M. Nystrom; Visually Mining and Monitoring Massive Time Series; 2004; International Conference on Knowledge Discovery and Data Mining archive, Proceedings of the tenth ACM SIGKDD international conference on Knowledge discovery and data mining table of contents; pp. 460-469.*

(Continued)

*Primary Examiner* — Jeffery A Brier (57) ABSTRACT

To visualize and analyze data, selection of at least one focus area in a visualization of a data set is received. Based on characteristics of the selected at least one focus area, using at least one analytic technique to mine relationships between data items and at least one attribute in the selected at least one focus area and data items and at least one attribute in remaining portions of the data set. At least one visual representation is generated to show mining results produced from selected data items and one or more attributes in the selected at least one focus area and the remaining portions of the data set, where the generated visual representation is composed to have an order and layout to represent the mined results.

22 Claims, 4 Drawing Sheets
(3 of 4 Drawing Sheet(s) Filed in Color)

U.S. PATENT DOCUMENTS

| | | | |
|---|---|---|---|
| 5,844,553 | A | 12/1998 | Hao et al. |
| 5,878,206 | A | 3/1999 | Chen et al. |
| 5,903,891 | A | 5/1999 | Chen et al. |
| 5,924,103 | A | 7/1999 | Ahmed et al. |
| 5,929,863 | A | 7/1999 | Tabei et al. |
| 5,940,839 | A | 8/1999 | Chen et al. |
| 5,986,673 | A | 11/1999 | Martz |
| 5,999,193 | A | 12/1999 | Conley, Jr. et al. |
| 6,052,890 | A | 4/2000 | Malagrino, Jr. et al. |
| 6,115,027 | A | 9/2000 | Hao et al. |
| 6,144,379 | A | 11/2000 | Bertram et al. |
| 6,211,880 | B1 | 4/2001 | Impink, Jr. |
| 6,211,887 | B1 | 4/2001 | Meier et al. |
| 6,269,325 | B1 | 7/2001 | Lee et al. |
| 6,314,453 | B1 | 11/2001 | Hao et al. |
| 6,377,287 | B1 | 4/2002 | Hao et al. |
| 6,400,366 | B1 | 6/2002 | Davies et al. |
| 6,429,868 | B1 | 8/2002 | Dehner, Jr. et al. |
| 6,466,946 | B1 | 10/2002 | Mishra et al. |
| 6,466,948 | B1 | 10/2002 | Levitsky et al. |
| 6,502,091 | B1 | 12/2002 | Chundi et al. |
| 6,584,433 | B1 | 6/2003 | Zhang et al. |
| 6,590,577 | B1 | 7/2003 | Yonts |
| 6,603,477 | B1 | 8/2003 | Tittle |
| 6,658,358 | B2 | 12/2003 | Hao et al. |
| 6,684,206 | B2 | 1/2004 | Chen et al. |
| 6,727,926 | B1 | 4/2004 | Utsuki et al. |
| 6,934,578 | B2 | 8/2005 | Ramseth |
| 7,020,869 | B2 | 3/2006 | Abari et al. |
| 7,202,868 | B2 | 4/2007 | Hao |
| 7,221,474 | B2 | 5/2007 | Hao et al. |
| 7,313,533 | B2 | 12/2007 | Chang et al. |
| 7,567,250 | B2 | 7/2009 | Hao et al. |
| 7,714,876 | B1 | 5/2010 | Hao |
| 2002/0118193 | A1 | 8/2002 | Halstead, Jr. |
| 2002/0171646 | A1 | 11/2002 | Kandogan |
| 2003/0065546 | A1 | 4/2003 | Goruer et al. |
| 2003/0071815 | A1 | 4/2003 | Hao et al. |
| 2003/0128212 | A1* | 7/2003 | Pitkow ............ 345/440 |
| 2003/0221005 | A1 | 11/2003 | Betge-Brezetz et al. |
| 2004/0051721 | A1 | 3/2004 | Ramseth |
| 2004/0054294 | A1 | 3/2004 | Ramseth |
| 2004/0054295 | A1 | 3/2004 | Ramseth |
| 2004/0168115 | A1 | 8/2004 | Bauernschmidt |
| 2004/0201588 | A1* | 10/2004 | Meanor et al. ......... 345/440 |
| 2004/0210540 | A1 | 10/2004 | Israel et al. |
| 2004/0252128 | A1 | 12/2004 | Hao |
| 2005/0066026 | A1 | 3/2005 | Chen et al. |
| 2005/0119932 | A1 | 6/2005 | Hao |
| 2005/0219262 | A1 | 10/2005 | Hao et al. |
| 2006/0095858 | A1 | 5/2006 | Hao et al. |
| 2007/0225986 | A1 | 9/2007 | Bowe, Jr. et al. |
| 2009/0033664 | A1 | 2/2009 | Hao et al. |

OTHER PUBLICATIONS

Eamonn Keogh, Harry Hochheiser, and Ben Shneiderman; An Augmented Visual Query Mechanism for Finding Patterns in Time Series Data; 2002; Lecture Notes in Computer Science, Proceedings of the 5th International Conference on Flexible Query Answering Systems; Springer-Verlag; vol. 2522/2002; pp. 240-250.*

Wei Peng, Matthew O. Ward and Elke A. Rundensteiner; Clutter Reduction in Multi-Dimensional Data Visualization Using Dimension Reordering; Date of Current Version: Jan. 24, 2005; IEEE Symposium on Information Visualization, 2004, INFOVIS 2004; pp. 89-96.*

Wei Peng; Clutter-Based Dimension Reordering in Multi-Dimensional Data Visualization; Jan. 2005; A Thesis; Worcester Polytechnic Institute; pp. 1-82.*

Chris Stolte et al., "Polaris: A System for Query, Analysis and Visualiztion of Multidimensional Relational Databases," IEEE Transactions on Visualization and ComputerGraphics, vol. 8, No. 1, pp. 1-14 (Jan.-Mar. 2002).

Daniel A. Keim et al., "VisDB: Database Exploration Using Multidimensional Visualization," IEEE Graphics and Applications, vol. 14, No. 5, pp. 40-49 (1994).

Matthew O. Ward, "XmdvTool: Integrating Multiple Methods for Visualizing Multivariate Data," Proc. Visualization, pp. 326-331 (Oct. 1994).

H. Hochheiser et al., "Dynamic Query Tools for Time Series Data Sets: Timebox Widgets for Interactive Exploration," Information Visualization, vol. 3, pp. 1-18 (2004.

P. Buono et al., "Technical Research Report, Interactive Pattern Search in Time Series," Institute for Systems Research, TR 2005-57, pp. 1-11 (2004.

J. Yang et al., "Visual Hierarchical Dimension Reduction for Exploration of High Dimensional Datasets," Joint Eurographics/IEEE TCVG Symposium on Visualization, pp. 19-28 (May 2003).

Deun et al., Multidimensional Scaling, Open and Distance Learning, Jan. 12, 2000 (pp. 1-16).

http://www.pavis.org/essay/multidimensional_scaling.html, 2001 Wojciech Basalaj, (pp. 1-30).

D. Keim et al Pixel Bar Charts: A New Technique for Visualization Large Multi-Attribute Data Sets with Aggregation:, HP Technical Report, Apr. 2001, pp. 1-10.

M. Ankerst et al "Towards an effective cooperation of the computer and the computer user for classification, Proc. 6th Int. Conf. on Knowledge Discovery and Data Mining ," (KDD'2000), Aug. 20-23, 2000, Boston, MA, 2000, pp. 1-10.

M.C. Hao et al "Visual Mining of E-customer Behavior Using Pixel Bar Charts,", HP Technical Report, Jun. 20, 2001, pp. 1-7.

B. Shneiderman, "Tree Visualization with Treemaps: a 2-D Space-Filling Approach", pp. 1-10, Jun. 1991.

D. Keim et al "Hierarchical Pixel Bar Charts", IEEE Transactions on Visualization and Computer Graphics, vol. 8, No. 3, Jul.-Sep. 2002, pp. 255-269.

Daniel Keim et al "Designing Pixel-Orientated Visualization Techniques: Theory and Applications" IEEE Transactions on Visualization and Computer Graphics, vol. 6, No. 1, Jan.-Mar. 2000, pp. 59-78.

U.S. Appl. No. 11/523,240 entitled "Time Relevance-Based Visualization of Data" filed on Sep. 19, 2006, pp. 1-22.

* cited by examiner

GENERATING A VISUALIZATION TO SHOW MINING RESULTS PRODUCED FROM SELECTED DATA ITEMS AND ATTRIBUTE(S) IN A SELECTED FOCUS AREA AND OTHER PORTIONS OF A DATA SET

BACKGROUND

Various techniques can be used for visualizing data sets, including large multi-dimensional data sets (which contain multiple dimensions or attributes). Examples of techniques of visualizing data sets include graphs, bar charts, pixel bar charts (in which pixels represent corresponding transaction records and are assigned colors based on values of attributes), pie charts, and so forth.

When large data sets are visualized, especially large multi-dimensional data sets, manually finding similar patterns occurring somewhere in a data set can be difficult, time-consuming, and impractical.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are described with respect to the following figures.

DETAILED DESCRIPTION

In accordance with some embodiments, an intelligent visual analytics query processing algorithm (as performed by a software tool, for example) is provided to allow for user selection of a target region of interest (focus area) within a visualization that represents a data set, such that relationships between the selected focus area and remaining portions of the data set can be determined. The data set that is visualized can be a large, multi-dimensional data set (a data set having multiple dimensions or attributes and a relatively large number of data points). In the ensuing discussion, "dimensions" and "attributes" of a data set are used interchangeably.

There may be one or more interesting local patterns within the visualized data set that may be of interest to an analyst (or other user). An analyst may wish to identify other portions of the data set that may have patterns similar to the one or more local patterns of interest. Also, an analyst may wish to determine causes and/or impacts of such one or more local patterns of interest. A "local pattern" in a visualized data set refers to some sub-region in the visualized data set that contains data points having values of interest to an analyst (e.g., data values indicating long delays, slow response times, etc.). Such an analysis allows the analyst to better understand performance or other characteristics associated with operations of an enterprise, such as a business, educational organization, or government agency.

Based on a selected focus area, the intelligent visual analytics query processing algorithm analyzes characteristics of the selected focus area, where the characteristics include data items, attribute(s), and possibly one or more groups. According to the characteristics, the algorithm then selects an analytic technique to mine relationships of data items and at least one attribute in the focus area with data items and at least one attribute in remaining portions of the data set. Mining relationships of data items and attributes refers to one or more of measuring the relationships, correlating the relationships, or otherwise determining the relationships. An "analytic technique" refers to a technique that is able to make some type of a correlation, comparison, or other analysis task to identify a similarity relationship between characteristics of the selected focus area and other portions of the data set.

Based on the mined relationships, the intelligent visual analytics query processing algorithm produces a visualization to show mining results produced from selected data items and one or more attributes in the selected focus area and the remaining portions of the data set, where the generated visual representation is composed to have an order and layout to represent the mined results. The order in the visualization is an order of graphical representations of the data items/attributes according to the mined relationships. The layout of the visualization defines an arrangement of graphical representations, data items, and attributes. The produced visualization allows an analyst to more easily and accurately visualize similar patterns across multiple portions of the data set. For example, various data collections (groups) can be ordered in a visualization screen according to the degree of similarity between patterns occurring in these data collections with the pattern that exists in the selected focus area.

Alternatively, the produced visualization can show relationships between attribute(s) of the focus area and other attributes of the data set. This allows an analyst to easily understand the causes and/or impacts of attribute values in the focus area (e.g., what attributes are contributing to high sales in certain geographic regions). Although reference has been made to selecting a focus area, note that the intelligent visual analytics query processing algorithm also allows for selection of plural focus areas in a visualization.

In some embodiments, the data collections of the data set include multiple time series, where each time series refers to a collection of data over time. In other implementations, other data collections can be employed. In the ensuing discussion, a data "collection" is used interchangeably with a data "group."

A data set can be divided into multiple groups and can have multiple attributes. In selecting the focus area that is to be compared to remaining portions of the data set, a user can select one attribute or multiple attributes in one group or multiple groups.

Such selection of one or multiple attributes in one or multiple groups corresponds to various use cases that are supported by the visual analytics query processing algorithm. In one embodiment, there are four potential use cases that correspond to the focus area selectable by the user. As noted above, a data set can include multiple attributes (dimensions) and multiple groups (e.g., multiple time series). The four potential use cases are as follows: case 1 (select one attribute in one group); case 2 (select multiple attributes in one group);

case 3 (select one attribute in multiple groups); and case 4 (select multiple attributes in multiple groups).

In one specific example, performance data associated with multiple computer servers can be monitored. One time series for measured data values collected over time can be received for each corresponding server. The measured data values can include measured data values for one or more attributes, such as queue length, disk usage, and so forth. In this example, the four possible use cases can be applied based on the number of attributes selected and the number of time series (groups) selected in the target region.

Figure 1:
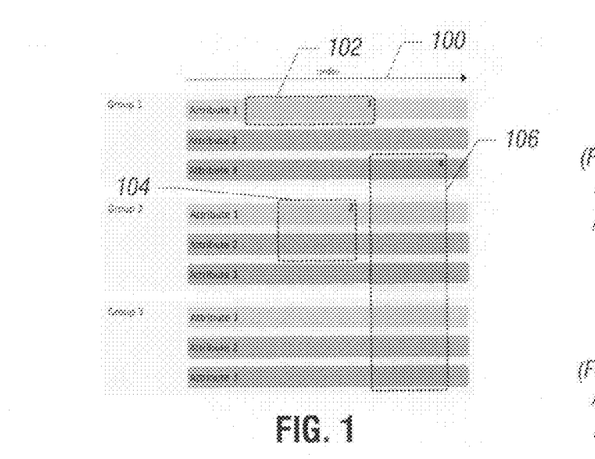
FIGS. 1-3 illustrate three different visualization techniques that allow for a user to select a focus area to allow for analysis of relationships between the selected focus area and other data collections, in accordance with some embodiments.

In case 1, the selected focus area causes selection of just one attribute in one group. This is illustrated in the example of FIG. 1, which shows a visualization map for three groups (group 1, group 2, and group 3), where each group has three attributes (attribute 1, attribute 2, and attribute 3). The horizontal axis 100 of the visualization map refers to some order of the attribute values, such as a time order. As depicted in FIG. 1, a first selected focus area 102 causes selection of one attribute in one group (attribute 1 in group 1). Selection of the focus area 102 (and any other focus areas) can be based on a rubber-banding operation in which a user uses a pointer device (e.g., mouse device) to select a region by clicking or holding onto a control button.

A second use case, case 2, refers to the selection of multiple attributes in one group. This is illustrated by selected focus area 104 in FIG. 1, in which two attributes (attributes 1 and 2) of one group (group 2) have been selected in the focus area 104.

A fourth use case, case 4, selects multiple attributes in multiple groups. This is illustrated in FIG. 1 as selected focus area 106, in which multiple attributes in multiple groups (groups 1-3) have been selected.

Although not depicted in FIG. 1, a third use case, case 3, can also be specified, where case 3 involves selection of one attribute in multiple groups. To do so, multiple regions can be selected, where the multiple regions cover the same attribute in different groups.

The selection of a focus area (which contains a local pattern to a user) effectively specifies a query that analysis is to be performed based on the characteristics of the focus area. The analysis involves a mining of relationships of the characteristics of the focus area with the remaining portions of the data set, such that a visualization can be provided of the data set according to the mined relationships. The intelligent visual analytics query processing algorithm allows for flexibility in allowing a user to submit various visual queries (of varying complexity according to one of the use cases discussed above). The algorithm can automatically process the query to produce a visualization result that is adapted to the outcome of the analysis performed by the query.

Some embodiments allow the algorithm to select from multiple analytic techniques for measuring relationships between characteristics of a selected focus area and other portions of a data set. Examples of the analytic techniques include a statistical analytic technique (e.g., a correlation technique), a similarity measure technique, and a data mining technique (e.g., clustering, classification, etc.).

Figure 2:
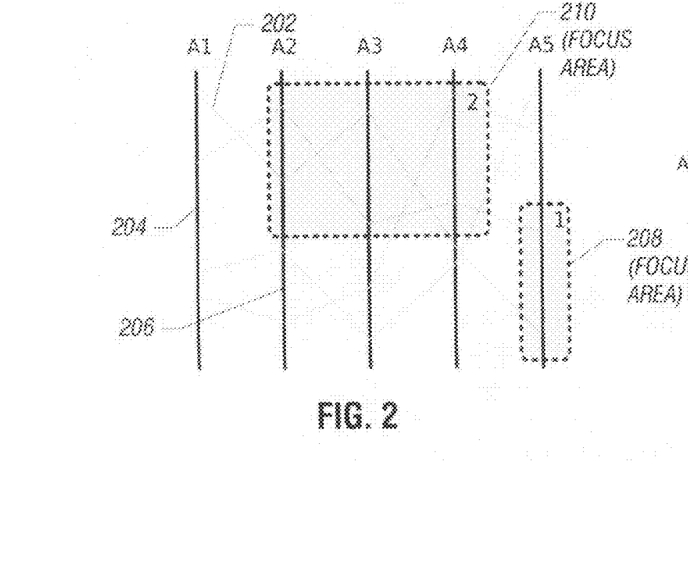
Figure 3:
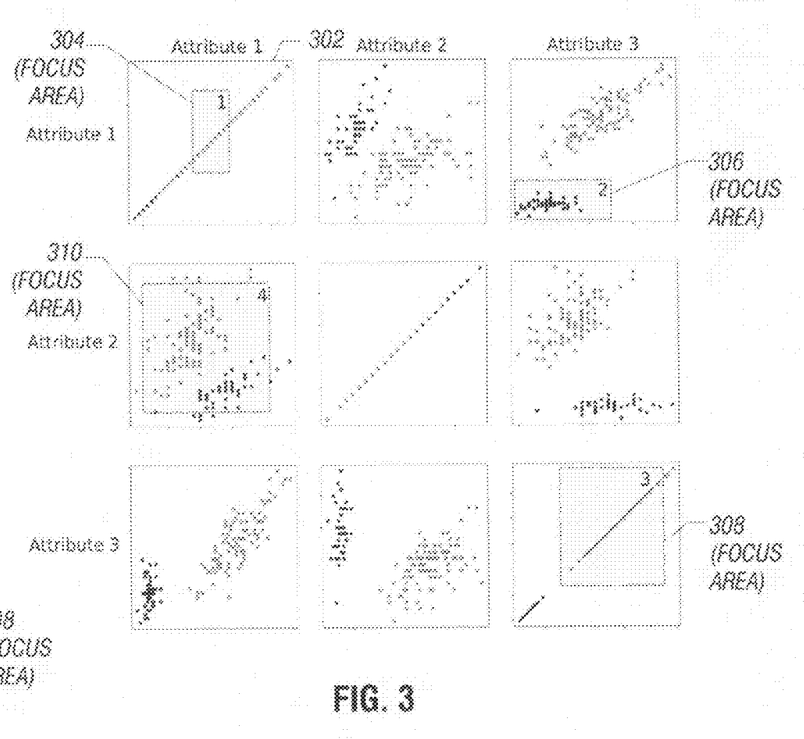

FIGS. 2 and 3 illustrate other types of visualizations of data. FIG. 2 depicts a parallel coordinates graph, in which vertical bars represent different attributes A1, A2, A3, A4, and A5, with points along each vertical bar representing different data values of the corresponding attribute. The various zigzag lines in the graph that connect the attribute bars are used to show relationships between different data points across different attributes. Thus, for example, a line 202 connecting a data point on vertical bar 204 (for attribute A1) to a data point on vertical bar 206 (for attribute A2) represents that the corresponding data point for A1 is related to the corresponding data point for A2. In the parallel coordinates graph of FIG. 2, focus areas for two use cases (case 1 and case 2) are shown. A selected focus area 208 corresponds to case 1 (one attribute in one group), whereas selected focus area 210 corresponds to case 2 (multiple attributes in one group).

Focus area selection can also be made in yet another type of visualization, as depicted in FIG. 3, which shows a scatter plot graph. In the scatter plot graph, attributes are plotted against each other in an array of grids. Thus, in the example of FIG. 3, the first row of grids represents attribute 1, the second row of grids represents attribute 2, and the third row of grids represents attribute 3. Similarly, the first column of grids represents attribute 1, the second column of grids represents attribute 2, and the third column of grids represents attribute 3. In the first grid 302 (which plots attribute 1 against attribute 1), the data points are provided along a diagonal line since any data point of attribute 1 is related (e.g., equal) to itself. The different colors for the data points represent different group memberships. Thus, in the example of FIG. 3, green represents that the data points are in group 1, red represents that the data points are in group 2, and black represents that the data points are in group 3.

In FIG. 3, a first selected focus area 304 represents case 1, since just one attribute (attribute 1) in one group (the group corresponding to green data points) is selected in the region 304. Focus area 306 represents case 2, since multiple attributes (attributes 1 and 3) in one group (the group corresponding to the black data points) are selected. Focus area 308 represents case 3, since one attribute (attribute 3) in multiple groups (groups corresponding to green and red data points) have been selected. Focus area 310 represents case 4, since multiple attributes (attributes 1 and 2) in multiple groups (all three groups) have been selected.

Note that the various visualizations can assign different data values (or groups of data values) to different colors. For example, in the visualization map, pixel bars each containing pixels assigned various colors can be used. Also, in the scatter plot graph, different groups are assigned different colors.

Although four use cases have been referred to in some embodiments, it is noted that in other embodiments, other use cases are also contemplated. For example, a fifth use case may be provided, where in the fifth use case, multiple attributes in multiple groups with multiple disjoint intervals are defined. This is the most general case and corresponds to multiple selections within one query that range across multiple attributes, multiple groups, and multiple intervals. This can correspond to the combination of focus areas 104 and 106 in FIG. 1, in one example.

Note that in case 1 (one attribute in one group), there is no distinction between ordered and unordered data. In a data set with no grouping, the algorithm searches for other attributes that are most closely related to the attribute and data items in the selected focus area. On the other hand, in a data set in which grouping is provided, the algorithm searches for relevant attributes within the selected group.

In case 2 (multiple attributes in one group), since there are multiple attributes involved, the intelligent visual analytics query processing algorithm in one example implementation can distinguish between a visualization that has a designated ordering attribute (FIG. 1) and a visualization without consistent ordering (FIGS. 2 and 3). The visualization map of FIG. 1 orders attribute values in each row (bar) according to some order, such as a time stamp or some other value. However, the data values in the parallel coordinates graph or the scatter plot graph are sorted differently on each axis, based on the value of the corresponding attribute. For ordered visualizations (such as in the visualization map of FIG. 1), the intelligent visual analytics query processing algorithm analyzes other groups with respect to characteristics of the selected focus area to determine relevance of the other groups to the selected focus area. The result can be used for reordering the groups in the output visualization produced by the intelligent visual analytics query processing algorithm. It is also possible to analyze the selected focus area and identify other attributes that are relevant to the selected attributes.

In case 2, for unordered visualizations without grouping, such as in the parallel coordinates graph of FIG. 2, the analytic technique used can be clustering to find relevant attributes, for example. On the other hand, for unordered visualizations with grouping, such as in the scatter plot graph of FIG. 3, a different analytic technique can be used, such as searching through the scatter plot graph to find attribute pairs showing similar patterns as an attribute-pair in the selected focus area.

In case 3 (one attribute in multiple groups), the intelligent visual analytics query processing algorithm handles case 3 by applying case 1 independently for each selected group with case 3. The intelligent visual analytics query processing algorithm can search within each group for other attributes that are closely related to the selected attribute. The results can be individual sets of relevant attributes for each selected attribute.

With case 4 (multiple attributes in multiple groups), in which multiple attributes over multiple groups are selected, the intelligent visual analytics query processing algorithm, for ordered data, can search for other intervals that are related to the selected attributes and groups. For unordered data, the algorithm can perform a clustering and then searches for related data points.

Figure 4:
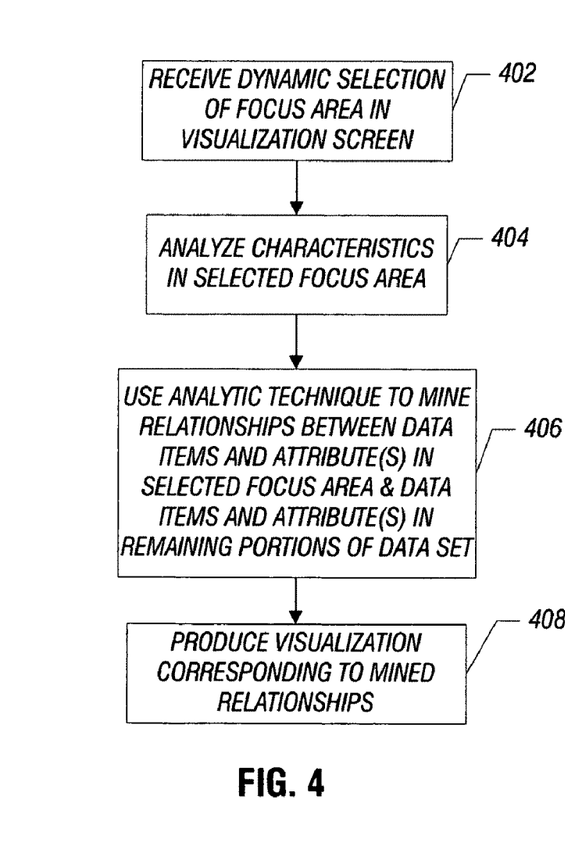
FIG. 4 is a flow diagram of an intelligent visual analytics query algorithm, in accordance with an embodiment.
Figure 7:
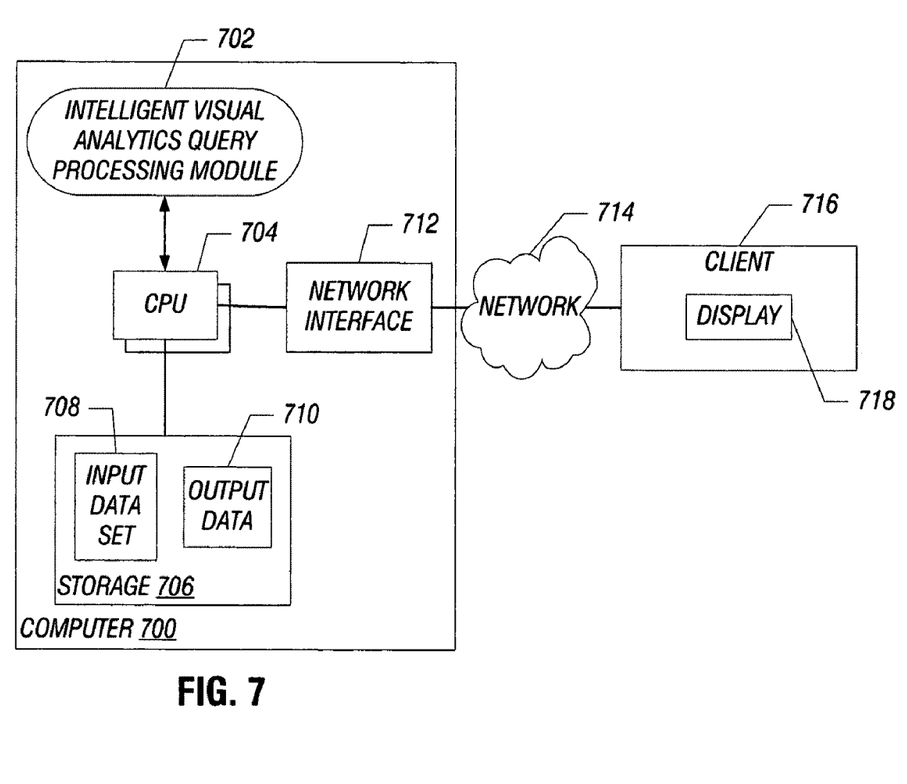
FIG. 7 is a block diagram of a computer that includes software to provide intelligent visual analytics query processing, according to an embodiment.

The intelligent visual analytics query processing algorithm is depicted generally in FIG. 4. The algorithm can be performed by software executable on a computer, as depicted in FIG. 7, for example. The algorithm receives (at 402) a dynamic selection of a focus area in a visualization screen. Dynamic selection refers to the ability to select any part of the visualization and the ability to make the selection at any time. The selection causes a visual query to be produced. As used here, a "visualization screen" refers to any graphical representation of data, such as any of the graphical representations of FIGS. 1-3 or other graphical representations. The term "screen" is intended to cover any displayed area that contains data being visualized.

The algorithm then analyzes (at 404) the characteristics (e.g., data items, one or more attributes in one or more groups, relationships between attributes, etc.) that correspond to the selected focus area. The selected focus area can include one attribute, or multiple attributes. Also, the selected data items can span one group or multiple groups. Based on the characteristics of the selected focus area, the algorithm uses (at 406) at least one analytic technique (selected from among plural possible analytic techniques) to mine the relationships between the data items and at least one attribute in the selected focus area and data items and at least one attribute in the remaining portions of the data set. Details regarding the mined relationships are discussed further below.

As discussed above, the mined relationships can be between the selected focus area in one or more groups and other groups. Thus, for example, if the selected focus area contains plural attributes in a first group, then the mined relationships can be between the selected attributes in the first group and the attributes in other groups (e.g., other servers). Alternatively, the mined relationships can be between attribute(s) of the selected focus area and other attributes.

Based on the mined relationships, an interactive visualization is produced (at 408) and is composed to have an order and layout that corresponds to the mined relationships. An "interactive visualization" refers to a visualization in which users can make selections, such as to see more detail or to zoom in. In one example, multiple data collections (groups) of the visualized data set can be reordered according to the mined relationships. In another example, the visualization that is produced can indicate which attributes are more closely related to a selected attribute (contained in the selected focus area) and which other attributes are not as closely related to the selected attribute. Also, the visualization produced can be transformed from an initial visualization in which the focus area selection was made. The transformed visualization can include just the data items within a time interval of the focus area, for example.

Figure 5A:
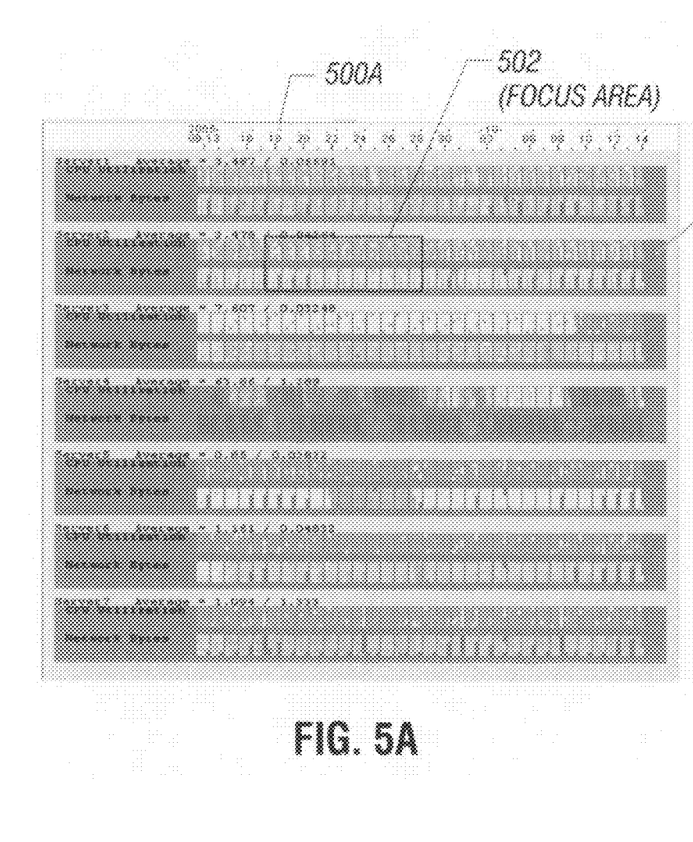
FIGS. 5A-5B illustrate visualization screens depicting various data collections before and after, respectively, application of an intelligent visual analytics query processing, according to an embodiment.
Figure 5B:
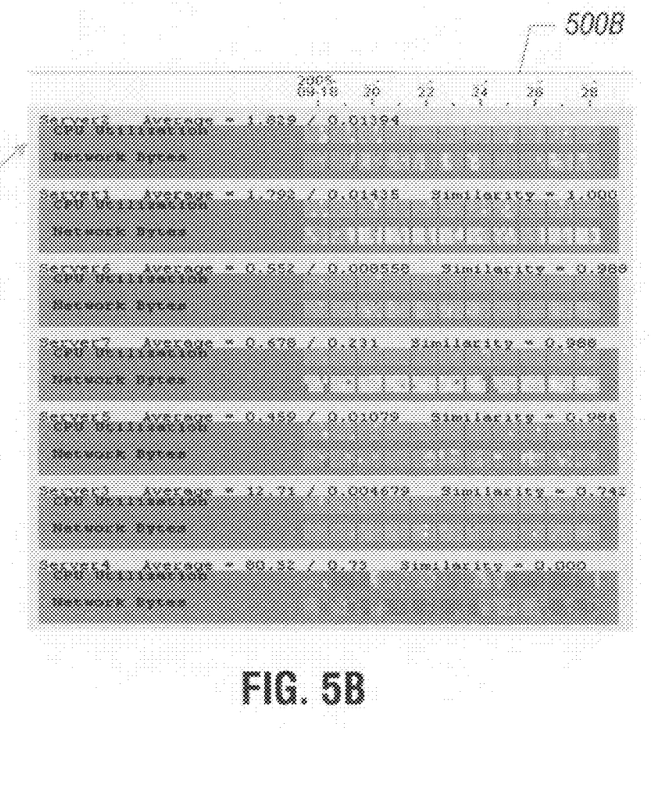

An example of the reordering and transformation of visualization of multiple groups of data is depicted in FIGS. 5A and 5B. FIG. 5A shows a visualization screen 500A prior to application of the intelligent visual analytics query processing algorithm, whereas FIG. 5B shows a visualization screen 500B that is changed from the visualization screen 500A after application of the algorithm. As shown in the FIG. 5A example, multiple groups containing respective attribute values are depicted for corresponding servers. Thus, the different time series of FIG. 5A represent different servers. Each group has two attributes in the example: CPU Utilization and Network Bytes. As depicted in FIG. 5A, to initiate the application of the intelligent visual analytics query processing algorithm on the visualization screen 500A, a user interactively selects a focus area 502 in the first group (the group corresponding to server 2). Note that the selection made here corresponds to case 2 discussed above, where multiple attributes from one group are selected.

Selection of the focus area 502 invokes the algorithm to mine relationships of data items and at least one attribute in the focus area and data items and at least one attribute in remaining portions of the data set. Based on the mined relationships, the groups are reordered according to visualization screen 500B in FIG. 5B. In the original visualization screen 500A, the order of groups is as follows: server 1, server 2, server 3, server 4, server 5, server 6, and server 7. After application of the intelligent visual analytics query processing algorithm, the groups are reordered as follows: server 2, server 1, server 6, server 7, server 5, server 3, and server 4. Note that the group for server 2 has been moved up from the second position in the visualization screen 500A to the first position in the visualization screen 500B. The order of the other groups has also been changed. Note that in the visualization screen 500B, the mined relationships are expressed by a Similarity measure associated with each group (other than the group for server 2). As depicted, the ordering of the group is based on descending values of the Similarity measure. In addition to reordering the groups, note that the visualization in 500B has been transformed from the visualization in 500A along the time axis—in other words, the data items depicted in the screen 500B are just data items in the time interval of focus area 502 in FIG. 5A.

By reordering the groups as depicted in FIG. 5B, an analyst is able to easily determine which servers have similar performance behaviors in relation to the attributes selected in focus area 502, which corresponds to a particular time interval. Groups of servers with more similar performance characteristics are placed nearer the top of the screen 500B than groups of servers with less similar performance characteristics.

Figures 6A, 6B:
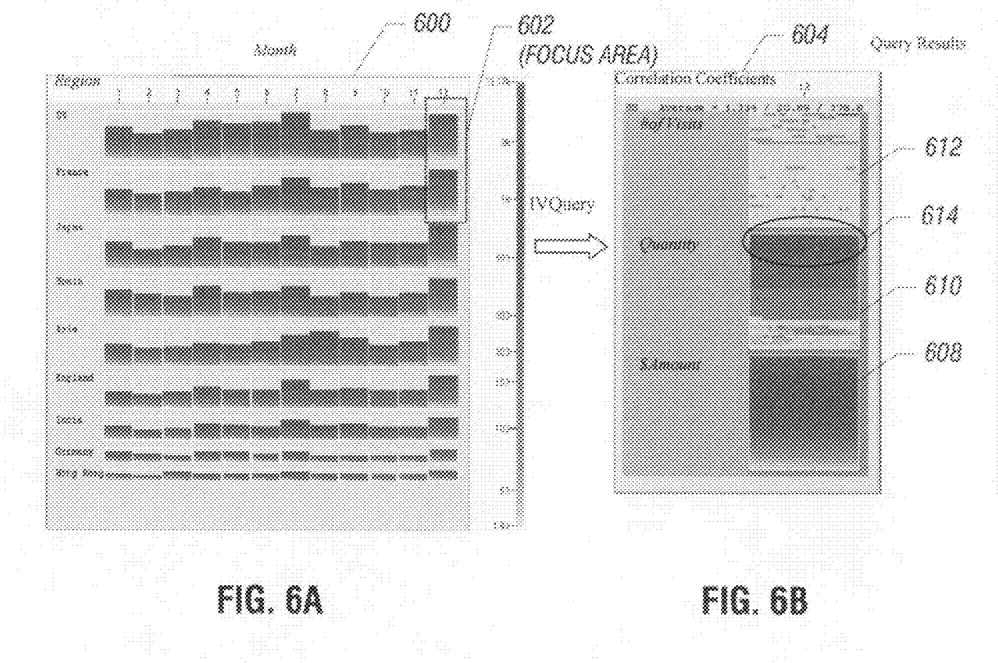
FIGS. 6A-6C illustrate visualization screens depicting application of an intelligent visual analytics query processing in another context, according to an embodiment.
Figure 6C:
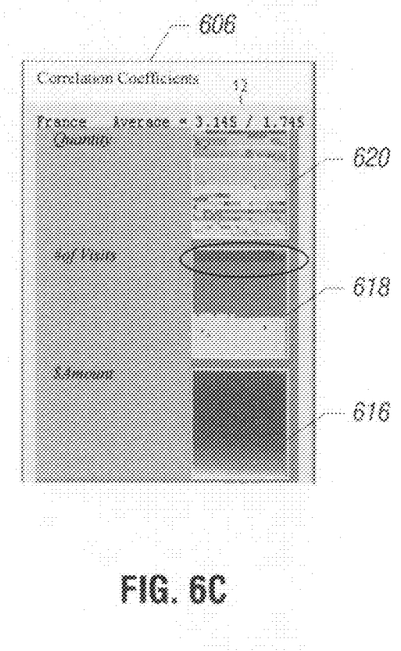

In addition to being able to visualize an order of data collections according to similarity between the data collections, the intelligent visual analytics query processing algorithm can also allow for attributes that are closely related to a selected attribute (in the selected focus area) to be visualized in closer proximity to the selected attribute. An example of this is depicted in FIGS. 6A-6C. FIG. 6A shows a visualization map 600 of sales data over a period of 12 months. The various time series correspond to different countries, including the US, Frances, Japan, and so forth. Each time series has pixel bars (one pixel bar per month), with each pixel bar having pixels representing respective invoices in the example. The colors of the pixels represent invoice sales ($Amount). In the example, US and France in month 12 have the most invoices and the highest $Amount values. To find the reasons for this, the analyst can select a focus area 602 that contains one attribute ($Amount) in two groups (US and France) (case 3). The algorithm analyzes the selected invoices and computes the corresponding correlation coefficients between the attribute $Amount and other sales attributes (e.g., Quantity, #ofVisits, locations, etc.) of the data set.

FIGS. 6B-6C show output visualizations, in the form of visualization screens 604 and 606 produced by the intelligent visual analytics query processing algorithm, that show correlations between the selected attribute $Amount and the other attributes. The visualization screen 604 includes three pixel blocks 608, 610, and 612 corresponding to three attributes $Amount, Quantity, #ofVisit, for US invoices. In FIG. 6B, the $Amount for US product sales correlates more to the customers buying more items (Quantity) than to the number of times the customers visit (#ofVisits). The Quantity attribute values in the black oval 614 in FIG. 6B show that the high $Amount invoices (at the top of the bar 608) correspond to high Quantity values (red and burgundy) in the oval 614. This indicates that the values of both attributes $Amount and Quantity change at about the same pace.

As further depicted in FIG. 6B, $Amount correlates less to the number of times the customers visit (#ofVisits). There are many one time customers (yellow) that appear in the high $Amount areas (the top of the bar 612).

On the other hand, FIG. 6C shows a visualization screen 606 having bars 616, 618, and 620 corresponding to the $Amount, #ofVisits, and Quantity attributes in France. As depicted in the visualization screen 606, high $Amount values in bar 616 correlate more to high #ofVisits values, which indicates that high $Amount values are due to increased return visits by customers (high values of #ofVisits). After knowing their customer purchase behaviors based on the output visualization screens 604 and 606, sales analysts can plan their new sales strategies for different geographic regions (e.g., US and France).

The above examples refer to changed layouts for visualization maps. In the parallel coordinates graph example of FIG. 2, a reordering that can be performed would be a reordering of the vertical bars representing different attributes. Thus, if the selected focus area is the region 208 in FIG. 2, then the other attributes A1-A4 may be reordered with the attributes having a higher correlation to the selected interval of the attribute A5 placed closer to the vertical bar corresponding to the attribute A5.

Similarly, with the scatter plot graph of FIG. 3, the ordering of the attributes in the array of grids can be changed based on similarities between attributes as detected by the intelligent visual analytics query processing algorithm.

The following describes more formally the intelligent visual analytics query algorithm according to one example implementation. Let $D=\{D_1, \ldots, D_k\}$ be a set of attributes (dimensions), where k represents the number of dimensions, and where each dimension includes an ordered set of n observations $D_i=\{d_i^1, \ldots, d_i^n\}$, $i \in \{1, \ldots, k\}$. The order of the observations can be based on the values of a selected ordinal or continuous attribute, or the time stamp of an attribute when dealing with time-related data. The dimensions may belong to a number of groups.

The intelligent visual analytics query processing algorithm allows the selection of a subset $D' \subset D$ (based on selection of a focus area as in FIGS. 1-3), where the selected subset $D'=\{D'_1, \ldots, D'_l\}$ includes l dimensions, where each dimension $D'_j$, $j \in \{1, \ldots, l\}$, in D' has h data values $D'_j=\{d_j^z, \ldots, d_j^{z+h}\}$. The selection is done interactively by the analyst by selecting an area of interest in an underlying visualization V(D) of D.

The selected subset D' may contain multiple data items across multiple intervals. The goal of the algorithm is to identify data portions that are related to the selected data. More formally, the goal is to effectively retrieve a target set $D'' \subset D$ with $Rel(D',D'') \to max$, where $Rel(X,Y) \to rel$ defines a relevance function that assigns a relevance value $rel \in R$, $0 \leq rel \leq 1$ to each pair of data portions (X,Y) with $X,Y \subset D$. The higher the relevance value is, the stronger the relationship between the D' and D''.

Based on these definitions, two issues may arise: the first issue is the question of how to determine D'' from the data set D, and the second issue is the question of how to compute Rel(D',D'') for arbitrary D', D''. Since the input data set D can be seen as a matrix with columns $D_i$ and rows $d_i^j$, an arbitrary selection of a subset D' results in a (h*l) matrix by selecting multiple data values h across multiple dimensions l. If the user selects only h values from a single dimension or a single record across l dimensions, D' would result in an l- (resp. h-) dimensional vector. In general, there are $$\binom{k*n}{h*l}$$

possible selections of subsets $D' \subset D$ of size h*l that may be considered, where l is the number of dimensions and h is the number of rows of the selected data matrix D'.

For a given selection, there are multiple possible analyses (different analytic techniques discussed above) to determine the target data set D'' with maximal (or higher) relevance. The intelligent visual analytics query processing algorithm provides effective heuristics to focus on meaningful use cases (e.g., the various cases discussed above) when looking for relationships in the data. To determine Rel(D',D'') for arbitrary D', D'', the algorithm can use a number of analysis, similarity and correlation analytic techniques. Depending on the characteristics of the selected data D', the analytic technique is selected accordingly. If D' contains, for example, a single attribute, the pair-wise correlation to all other attributes can be computed. If D' contains multiple attributes, the similarity to other sets of attributes D'' can be computed by pair-wise similarity measures $SIM(D_i, D_j)$ with $D_i \in D'$ and $D_j \in D''$. Other comparisons or analyses can also be performed in other examples.

A specific procedure for the intelligent visual analytics query processing algorithm is provided below in the following pseudocode. The input to the procedure is a set of attribute dimensions D, interactive selection $D' \subset D$, ordering attribute $D_o \in D$, and grouping attribute $D_g \in D$. The output is D ordered by relevance.

```
1  if D_g = φ or |D'_g| =1 then                         /* one group selected */
2    if |Attribs(D')| = 1 then                          /* one attribute selected */
3      // Case 1: (One Attribute in One Group)
4      /* consider all attributes of the selected group                */
5      for each attrib in Attribs(Groups (D')) do
6        /* only observations in the selected group and interval are considered  */
7        d = filter (attrib., Groups (D'), Interval (D'));
8        rel [attrib] = calculateRelevance (D', d);
9    else                                               /* multiple attributes selected */
10     // Case 2: Multiple Attributes in One Group
11     for each group in Groups (D) do
12       /* only selected attributes are considered in each group      */
13       for each attrib in Attribs (D') do
14         d' = filter (attrib. Groups (D'), Interval (D'));
15         d = filter (attrib. group, Interval (D'));
16         r = calculateRelevance (d', d);
17         rel [group] = combine (rel/group/,r);
18 else                                                 /* multiple groups selected */
19   if |Attribs(D')| = 1 then                          /* one attribute selected */
20     // Case 3: One Attribute in Multiple Groups
21     /* handle as case 1 for each involved group                      */
22     for each group in Groups (D') do
23       ... (see case 1);
24   else if D_o ≠ φ then                               /* ordered and multiple attributes selected */
25     // Case 4: Multiple Attributes in Multiple Groups
26     /* search over ordering attribute                                */
27     for each interval in D_o with |Interval|=|D'| do
28       for each group in Groups (D') do
29         for each attrib in Attribs (D') do
30           d' = filter(attrib. group, Interval (D')):
31           d = filter (attrib. group, interval);
32           r = calculateRelevance (d', d):
33           rel [Interval] = combine (rel/interval/,r)
34   else                                               /*unordered and multiple attributes selected */
35     /* do not allow this case or provide a visualization dependent approach  */
36 return D, ordered by descending rel;
```

As noted above, the inputs to the pseudocode include the set of dimensions D, the dimensions in the selected focus area D', an ordering attribute $D_o$ (which is a subset of D) such as time for time series, and a grouping attribute $D_g$ (which is a subset of D) to group the data into multiple groups (such as multiple time series). The output of the pseudocode is D ordered by a relevance measure (see line 36 of the pseudocode).

In line 1 of the pseudocode, the first "if-then" clause if evaluated true indicates that one group is selected. If |Attribs (D')|=1 is true (line 2 of the pseudocode), then that indicates that only one attribute has been selected in the selected region. This corresponds to case 1. In computing the relevance measure (rel), only the observations in the selected group and interval are considered, as specified at line 7 of the pseudocode: d=filter(attrib,Groups(D'),Interval(D')), where attrib represents the selected attribute in D', Groups(D') indicates the group corresponding to the selected focus area, and Interval(D') represents the interval of the selected region. The relevance measure, rel, for the selected attribute (attrib) is calculated according to line 8 of the pseudocode, where the function calculateRelevance(D',d at line 8) is a selected one of analytic techniques to compute the relevance measure for each other attribute based on the selected attribute, group, and interval as defined by d.

The "else" condition at line 9 of the pseudocode corresponds to the "if-then" clause in line 2 of the pseudocode, and is satisfied when multiple attributes in one group are selected in the focus area (which corresponds to case 2). Line 11 of the pseudocode specifies that each group in the data set D is processed individually, as is each attribute (attrib) in selected subset D'. Line 14 of the pseudocode calculates d' to consider only observations in the selected group and interval. The value of d considers just a selected attribute (in D') and a group from D. A measure r is calculated by invoking the following function: calculateRelevance(d',d). Note that the r value is calculated for each individual attribute. Since there are multiple selected attributes in D', the multiple r measures corresponding to the multiple selected attributes are combined using the function at line 17 of the pseudocode to produce the rel measure for the particular group (group). The relevance measure, rel, computed at line 17 for case 2 in the pseudocode provides a measure of similarity between other groups and the characteristics of the selected subset D'.

If the "if-then" clause of line 1 is evaluated to not true, then the "else" condition at line 18 of the pseudocode is satisfied, which indicates that multiple groups have been selected in the focus area D'. If there is just one attribute selected from the multiple groups (case 3), line 19 of the pseudocode evaluates to true and the sub-procedure for case 1 at lines 3-8 of the pseudocode is repeated for each of the selected groups.

On the other hand, if more than one attribute is selected in the multiple groups (case 4), and there is no ordering attribute, the "else-if" condition at line 24 of the pseudocode evaluates to true, and the sub-procedure at lines 25-33 of the pseudocode is performed. In the sub-procedure for case 4, each individual interval (interval), group (group), and attribute (attrib) is considered individually, with rel measures calculated for each interval.

Other cases are captured by the "else" condition at line 34, with the example pseudocode indicating that these other cases are not allowed or some other approach can be considered.

Finally, line 36 of the pseudocode indicates that the output, D, is ordered by the relevance measures, rel.

As discussed above, the relevance measures representing relationships between the characteristics of the selected focus area, D', and other portions of the data set can be computed using different analytic techniques depending on an analysis of the characteristics.

In some cases, a correlation technique can be used, such as a Pearson Correlation r:

$$r = \frac{\sum_{i=1}^{n}(A_{1i} - \overline{A}_1)(A_{2i} - \overline{A}_2)}{\sqrt{\sum_{i=1}^{n}(A_{1i} - \overline{A}_1)^2 \sum_{i=1}^{n}(A_{2i} - \overline{A}_2)^2}}. \quad \text{(Eq. 1)}$$

This function computes the pair-wise correlation between bi-variate data $A_{1i}$ and $A_{2i}$ (which represent the dimensions of the data set). If two dimensions are perfectly correlated, the correlation coefficient is 1. The correlation technique is one example of a statistical analytic technique.

Another analytic technique is a similarity measure technique. To determine the similarity between dimensions or groups, the intelligent visual analytics query processing algorithm employs similarity measures such as the normalized Euclidean distance:

$$Sim(A_i, A_j) = \sqrt{\sum_{i=0}^{N-1}(b_i^1 - b_i^2)}, \quad \text{(Eq. 2)}$$

where $$b_i^j = \frac{a_i^j - \min(A_j)}{\max(A_j) - \min(A_j)}.$$

The parameter $a_i^j$ represents the i-th value of attribute $A_j$. The formula for $b_i^j$ performs a linear normalization of the i-th value of attribute $A_j$. Eq. 2 is therefore calculated on the normalized values, with each $b_i^j$ having a value between 0 and 1. Additionally, techniques for partial similarity analysis can be used, such as synchronized similarity:

$$Sim_{Syn}(A_k, A_l) = \max_{i,j}\left\{(j-i)\left|(0 \le i < j < N) \wedge \sqrt{\sum_{z=i}^{j} c_z} < \varepsilon\right.\right\}, \quad \text{(Eq. 3)}$$

where $$c_z = (b_z^k - b_z^l)^2.$$

Alternatively, another analytic technique is a data mining technique, such as a clustering technique (e.g., clustering) or a classification technique (e.g., nearest neighbor classification).

Based on the result of the analytic technique, the visual layout (determined in task 408 of FIG. 4) is rearranged according to the relationships between the selected region and the determined data portions with maximal (or increased) relevance. The goal is to adapt the layout (see, e.g., FIGS. 5A-5B and 6A-6C) so that related data portions are located closer to each other. For a given similarity vector S, the original arrangement of dimensions is given by a neighborhood relation N such that:

$$\Sigma N_{Query,Subset} * S(D_{Query}, D_{Subset}) \rightarrow \min. \quad \text{(Eq. 4)}$$

The neighborhood relation N is "1" if $D_{Query}$ (dimensions being compared to the selected one or more dimensions) and $D_{Subset}$ (selected one or more dimensions) are neighboring in the visualization, otherwise the neighborhood relation is "0". If the above formula is minimized, an optimal visual representation is obtained which retains relationship between $D_{Query}$ and $D_{Subset}$.

FIG. 7 shows an example arrangement that includes a computer 700 in which an intelligent visual analytics query processing module 702 is provided for performing the intelligent visual analytics query processing algorithm discussed above. The module 702 can be a software module executable on one or more central processing units (CPUs) 704, which is connected to a storage 706. The storage 706 includes an input data set 708, and output data 710 produced by the intelligent visual analytics query processing module 702.

The output data 710 or some report or graph based on the output data 710 can be provided through a network interface 712 of the computer 700 and over a data network 714 to a client computer 716 for presentation in a display 718, for example. Alternatively, a display can be attached directly to the computer 700 for visualizing the output data 710.

Instructions of software described above (including the intelligent visual analytics query processing module 702) are loaded for execution on a processor (such as one or more CPUs 704). The processor includes microprocessors, microcontrollers, processor modules or subsystems (including one or more microprocessors or microcontrollers), or other control or computing devices. As used here, a "controller" refers to hardware, software, or a combination thereof. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by a computer of visually analyzing data, comprising:

receiving, by the computer, selection of at least one focus area in a visualization of a data set;

based on characteristics of the selected at least one focus area, the computer using at least one analytic technique to mine relationships between data items and at least one attribute in the selected at least one focus area and data items and at least one attribute in remaining portions of the data set, wherein mining relationships between the focus area and the remaining portions of the data set comprises computing relevance measures between the focus area and the remaining portions of the data set; and generating, by the computer, at least one visual representation to show mining results produced from selected data items and one or more attributes in the selected at least one focus area and the remaining portions of the data set, wherein the generated visual representation is composed to have an order and layout to represent the mined results, wherein the order and layout positions data items of the remaining portions in the generated visual representation in relative proximity to the selected data items according to the relevance measures.

2. The method of claim 1, wherein using the at least one analytic technique comprises selecting at least one analytic technique from among plural different analytic techniques, wherein selecting the at least one analytic technique from among the plural analytic techniques comprise selecting the analytic technique from among a statistical technique, a similarity measure technique, and a data mining technique.

3. The method of claim 1, wherein producing the visual representation comprises producing a reordered version of the visualization of the data set in which data collections in the visualization of the data set have been reordered according to the relevance measures.

4. The method of claim 1, wherein generating the visual representation comprises generating an interactive visual representation.

5. The method of claim 1, wherein generating the visual representation comprises generating the visual representation that is transformed from the visualization of the data set.

6. The method of claim 1, wherein receiving the selection of the focus area in the visualization comprises receiving selection of the focus area in one of a visualization map, a parallel coordinates graph, and a scatter plot graph.

7. The method of claim 1, wherein receiving the selection of the focus area in the visualization comprises receiving selection according to one of multiple use cases, the multiple use cases including a first use case in which one attribute in one group is selected in the focus area, a second use case in which multiple attributes in one group are selected in the focus area, a third use case in which one attribute in multiple groups is selected in the focus area, and a fourth use case in which multiple attributes in multiple groups are selected in the focus area.

8. The method of claim 7, further comprising determining which of the use cases has been selected by the selection of the focus area.

9. The method of claim 1, wherein receiving the selection of the focus area in the visualization comprises receiving the selection of the focus area in response to a rubber-banding selection made with an input pointer device.

10. The method of claim 1, wherein the data items in one of the remaining portions that is associated with a corresponding one of the relevance measures indicating a closer relationship to the selected data items are positioned in closer proximity in the generated visual representation to the selected data items.

11. The method of claim 10, wherein the data items in the remaining portions are in corresponding plural groups, and wherein the order and layout positions a particular one of the groups of data items closer to a group of the selected data items in the generated visual representation if the relevance measure associated with the data items in the particular group indicates a closer relationship to the group of the selected data items.

12. The method of claim 1, wherein computing the relevance measures comprises one of:
   computing measures indicating correlations between the selected data items and the data items in the remaining portions; and
   computing measures of similarity between the selected data items and the data items in the remaining portions.

13. The method of claim 1, wherein the focus area spans a particular time interval that is less than a time interval of the visualization, and wherein generating the visual representation comprises generating the visual representation that contains data items in the remaining portions that are within the particular time interval but does not contain data items in the remaining portions outside the particular time interval.

14. The method of claim 1, wherein the visualization depicts plural groups of data items of the data set, wherein the plural groups are in a first order in the visualization, and
   wherein generating the visual representation comprises generating the visual representation that depicts subsets of the plural groups in a second order different from the first order, the second order based on the relevance measures.

15. A method executed by a computer of visualizing and analyzing data, comprising:
   receiving, by the computer, a query that is responsive to selection of a target region in a first visual representation of a data set, wherein the target region contains a portion of the data set;
   in response to the query, analyzing, by the computer, the target region to determine characteristics of the target region;
   according to the determined characteristics, the computer selecting an analytic technique to mine relationships between the characteristics of the target region and characteristics of other portions of the data set, wherein mining the relationships between the characteristics of the target region and characteristics of other portions of the data set comprises computing relevance measures between the target region and the other portions of the data set; and
   generating, by the computer, a second visual representation according to the mined relationships, wherein the second visual representation contains plural collections, where a first of the collections depicts content of the target region, and others of the plural collections depict respective other content of the other portions of the data set, and wherein the other collections are positioned with respect to the first collection in relative proximity according to the relevance measures.

16. The method of claim 15, wherein the first visual representation of the data set contains the plural collections in a first order, and wherein generating the second visual representation containing the plural collections comprises generating the second visual representation containing the plural collections in a second order different from the first order, wherein the second order is according to the relevancy measures.

17. The method of claim 15, wherein selecting the analytic technique comprises selecting from among plural analytic techniques, the plural analytic techniques comprising a statistical analytic technique, a similarity measure technique, a clustering technique, and a classification technique.

18. The method of claim 15, wherein the first and second visual representations assign different colors to different data values of data items of the data set.

19. The method of claim 15, wherein analyzing the target region to determine the characteristics comprises analyzing the target region to determine which of plural use cases have been selected, and wherein selecting the analytic technique is based on which of the plural use cases have been selected.

20. The method of claim 15, wherein the first collection depicts values of a first attribute of data items in the target region, and wherein the other collections depict values of respective other attributes of the data items in the target region.

21. A non-transitory computer-readable storage medium storing instructions that when executed cause a computer to:
receive selection of a target region in a visualization screen that provides visualization of a data set;
analyze characteristics of the selected target region;
based on the characteristics of the selected target region, select an analytic technique to mine relationships between the selected target region and other portions of the data set, wherein mining relationships between the selected target region and other portions of the data set comprises computing relevance measures between the selected target region and the other portions of the data set; and
produce a visual representation composed to have an order and layout according to the mined relationships, wherein the order and layout positions data items of the other portions of the data set in the visual representation in relative proximity to data items of the selected target region according to the relevance measures.

22. The non-transitory computer-readable storage medium of claim 21, wherein data items in the other portions are in corresponding plural groups, and wherein the order and layout positions a particular one of the groups of data items closer to a group of data items of the selected target region in the visual representation if the relevance measure associated with the data items in the particular group indicates a closer relationship to the group of the data items of the selected target region.

* * * * *